United States Patent
Williams et al.

(10) Patent No.: US 11,823,113 B2
(45) Date of Patent: *Nov. 21, 2023

(54) METHODS AND SYSTEMS FOR MANAGING SHIPPED OBJECTS

(71) Applicant: FedEx Corporate Services, Inc., Collierville, TN (US)

(72) Inventors: Amber Moriah Williams, Memphis, TN (US); Amy Mays, Memphis, TN (US); Cheri Bailey Shirokova, Germantown, TN (US); John Marshall Veitenheimer, Arlington, TN (US); Jessica Jordan Shoup, Olive Branch, MS (US); Surendra Ajmera, Germantown, TN (US)

(73) Assignee: FEDEX CORPORATE SERVICES, INC., Collierville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/206,418

(22) Filed: Mar. 19, 2021

(65) Prior Publication Data
US 2021/0209544 A1  Jul. 8, 2021

Related U.S. Application Data

(63) Continuation of application No. 13/961,518, filed on Aug. 7, 2013, now Pat. No. 10,984,368.

(51) Int. Cl.
*G06Q 10/08* (2023.01)
*G06Q 10/083* (2023.01)

(52) U.S. Cl.
CPC .................. *G06Q 10/083* (2013.01)

(58) Field of Classification Search
CPC .................................................. G06Q 10/083
See application file for complete search history.

(56) References Cited

U.S. PATENT DOCUMENTS

| | | |
|---|---|---|
| 5,790,935 A | 8/1998 | Payton |
| 7,187,278 B2 | 3/2007 | Biffar |
| 7,529,255 B2 | 5/2009 | Zlateff et al. |
| 7,747,543 B1* | 6/2010 | Braumoeller ...... G06Q 10/0833 |
| | | 705/330 |
| 8,314,704 B2 | 11/2012 | Cova et al. |
| 8,555,355 B2 | 10/2013 | Rathbun |

(Continued)

OTHER PUBLICATIONS

Fokum, Daniel T., Optimal Communications Systems and Network Design for Cargo Monitoring, University of Kansas, 2010.*

(Continued)

*Primary Examiner* — Nathan Erb
(74) *Attorney, Agent, or Firm* — FINNEGAN, HENDERSON, FARABOW, GARRETT & DUNNER LLP

(57) ABSTRACT

Methods and systems are disclosed for managing shipped physical objects. The methods and systems comprise receiving data associated with a journey of the shipped object and determining, using a processor, alert conditions based on the received data. Alert conditions are representative of risk of damage, loss, or delay associated with the shipped object. In addition, the methods and systems comprise transmitting one or more alternative options for mitigating the alert condition to a user, receiving a selection of one of the alternative options, and modifying the journey based on the received selection.

18 Claims, 11 Drawing Sheets

(56) References Cited

U.S. PATENT DOCUMENTS

| | | | |
|---|---|---|---|
| 8,696,151 B1* | 4/2014 | Barakat | G01K 3/04 |
| | | | 62/239 |
| 9,177,282 B2 | 11/2015 | Stevens et al. | |
| 9,974,042 B2 | 5/2018 | Skaaksrud | |
| 10,438,162 B2 | 10/2019 | Sharma et al. | |
| 10,984,368 B2* | 4/2021 | Williams | G06Q 10/083 |
| 10,990,922 B1 | 4/2021 | Subramanian et al. | |
| 2002/0082893 A1 | 6/2002 | Barts et al. | |
| 2002/0120475 A1 | 8/2002 | Morimoto | |
| 2003/0135304 A1* | 7/2003 | Sroub | G06Q 10/08 |
| | | | 701/1 |
| 2003/0149674 A1 | 8/2003 | Good et al. | |
| 2004/0225624 A1 | 11/2004 | Reynolds et al. | |
| 2005/0209978 A1 | 9/2005 | Bleumer | |
| 2006/0047379 A1* | 3/2006 | Schullian | G06Q 20/20 |
| | | | 701/19 |
| 2006/0116893 A1 | 6/2006 | Carnes et al. | |
| 2006/0229850 A1 | 10/2006 | Roberts | |
| 2006/0235739 A1 | 10/2006 | Levis et al. | |
| 2007/0056369 A1 | 3/2007 | Griffin et al. | |
| 2007/0159355 A1* | 7/2007 | Kelly | G08G 1/096716 |
| | | | 340/905 |
| 2008/0191961 A1 | 8/2008 | Tuttle | |
| 2009/0059004 A1 | 3/2009 | Bochicchio | |
| 2009/0281929 A1* | 11/2009 | Boitet | G06Q 10/08 |
| | | | 705/28 |
| 2010/0106603 A1* | 4/2010 | Dey | G01C 21/3617 |
| | | | 705/14.63 |
| 2010/0145754 A1* | 6/2010 | Rahman | G06Q 10/0837 |
| | | | 705/340 |
| 2010/0280750 A1* | 11/2010 | Chen | G01C 21/22 |
| | | | 701/465 |
| 2011/0018707 A1 | 1/2011 | Dobson et al. | |
| 2011/0074587 A1 | 3/2011 | Hamm et al. | |
| 2011/0106692 A1* | 5/2011 | Moore | G06Q 40/02 |
| | | | 705/38 |
| 2012/0023032 A1* | 1/2012 | Visdomini | G06Q 10/08 |
| | | | 705/338 |
| 2012/0179621 A1 | 7/2012 | Moir et al. | |
| 2012/0310854 A1 | 12/2012 | Cova et al. | |
| 2013/0033381 A1 | 2/2013 | Breed | |
| 2013/0110739 A1 | 5/2013 | Hill et al. | |
| 2013/0151133 A1* | 6/2013 | Kickbusch | B61L 27/16 |
| | | | 701/117 |
| 2013/0161386 A1 | 6/2013 | Tuttle | |
| 2013/0241726 A1 | 9/2013 | Hunter et al. | |
| 2014/0266668 A1 | 9/2014 | Blankenship et al. | |
| 2015/0039347 A1* | 2/2015 | Sharma | G06Q 10/0833 |
| | | | 705/4 |
| 2015/0262123 A1 | 9/2015 | Sharma et al. | |

OTHER PUBLICATIONS

International Searching Authority, Notification of Transmittal of the Int'l Search Report and the Written Opinion of the Int'l Searching Authority in corresponding application PCT/US2014/049222, dated Mar. 11, 2015, 6 pages.

Liu Yunxia et al., "Strategy of vehicle optimal scheduling about logistics delivery based on indeterminate information," Journal of Zhejiang University of Science and Technology, vol. 20, No. 4, pp. 289-291, Dec. 2008.

Office Action dated Dec. 26, 2018, issued by the Chinese Patent Office in Chinese Patent Application No. 201480055260 corresponding to PCT/US2014/049222 (11 pages).

Yang Daoli, "Risk Evaluation and Selection of Logistics Routes," Chinese Master's Theses Full-text Database, Economics and Management Sciences, No. 5, pp. J145-134, May 2012.

Bhuptani, et al.; RFID Field Guide Deploying Radio Frequency Identification Systems; Feb. 2005; Prentice Hall; USA (292 pages).

Bajpai, et al.; Provisional Application; *Location Privacy Enforcement in a Location-Based Services Platform*; Dec. 17, 2008 (22 pages).

Geofencing, A Useful Way to Corral Your Devices; posted by Katie Lane; Cisco Meraki; Sep. 11, 2013; (3 pages). https://web.archive.org/web/20131023085003/https://meraki.cisco.com/blog/2013/09/geofencing-a-useful-way-to-corral-your-devices/.

Heydon; Bluetooth Low Energy the Developer's Handbook; Oct. 2012; Prentice Hall; USA (368 pages).

Guidelines for Seafood Retailers; Govt. of Australia Dept. of Fisheries, Feb. 2002 (45 pages).

An Analysis of the requirements, Current Conditions and Opportunities for Traceability in the British Columbia Seafood Sector; Jun. 2005 (177 pages).

SiLabs; Optimizing Current Consumption in Bluetooth Low Energy Devices; Version 2.13 (https://docs.silabs.com/bluetooth/2.13/) (12 pages).

Tiware; An Introduction to QR Code Technology; *2016 International Conference on Information Technology*; IEEE Xplore (6 pages).

Vice Article; How the Railroad Industry Invented, Then Immediately Discarded, the Barcode; Oct. 24, 2017 (https://www.vice.com/en/article/qv38wp/how-the-railroad-industry-invented-then-immediately-discarded-the-barcode) (6 pages).

* cited by examiner

METHODS AND SYSTEMS FOR MANAGING SHIPPED OBJECTS

CROSS-REFERENCE TO RELATED APPLICATIONS

This application is a continuation application of and claims the benefit of priority to U.S. patent application Ser. No. 13/961,518, filed on Aug. 7, 2013, which is hereby incorporated by reference in its entirety.

TECHNICAL FIELD

The present disclosure relates to the field of shipping and, more particularly, methods and systems for detecting and reacting to monitored and contextual information associated with shipped objects.

BACKGROUND

Traditional systems for tracking location of a shipped object use barcodes that can be scanned to extract tracking numbers. For example, when an object arrives or leaves a point in its journey, a barcode affixed to the object may be scanned. A tracking number extracted from the barcode is often combined with a date and time of arrival or departure from a particular location, providing, for example, "package scan" data. However, package scan data alone merely provides arrival and departure times dependent on scanning the barcode, and lacks detailed information regarding the status of a customer's shipment. Furthermore, if problems arise during a shipment's journey, such as a delay due to mechanical breakdown, or damage due to hot weather, customers associated with such a shipment are unable to modify the shipment journey and mitigate losses.

Improvements in techniques for managing shipped objects are desirable.

SUMMARY

In one disclosed embodiment, a method for managing a shipped physical object is disclosed. The method comprises receiving data associated with a journey of the shipped object, determining, using a processor, an alert condition based on the received data, wherein the alert condition is representative of a risk of damage, loss, or delay associated with the shipped object, transmitting one or more alternative options for mitigating the alert condition to a user, receiving a selection of one of the alternative options, and modifying the journey based on the received selection.

In another disclosed embodiment, a server configured to manage a shipped physical object is disclosed. The server comprises one or more memory devices configured to store executable instructions, and one or more processors configured to execute the stored executable instructions to receive data associated with a journey of the shipped object, determine an alert condition based on the received data, wherein the alert condition is representative of a risk of damage, loss, or delay associated with the shipped object; transmit one or more alternative options for mitigating the one or more alert conditions to a user, receive a selection of the one of the alternative options, and modify the journey based on the selection.

In another disclosed embodiment, a non-transitory computer readable medium is disclosed. The non-transitory computer readable medium stores instructions for causing one or more processors to perform a method for managing a shipped physical object, comprising receiving data associated with a journey of the shipped object, determining an alert condition based on the received data, wherein the alert condition is representative of a risk of damage, loss, or delay associated with the shipped object, transmitting one or more alternative options for mitigating the alert condition to a user, receiving a selection of one of the alternative options, and modifying the journey based on the received selection.

Additional aspects related to the embodiments will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

DETAILED DESCRIPTION

Figure 1:
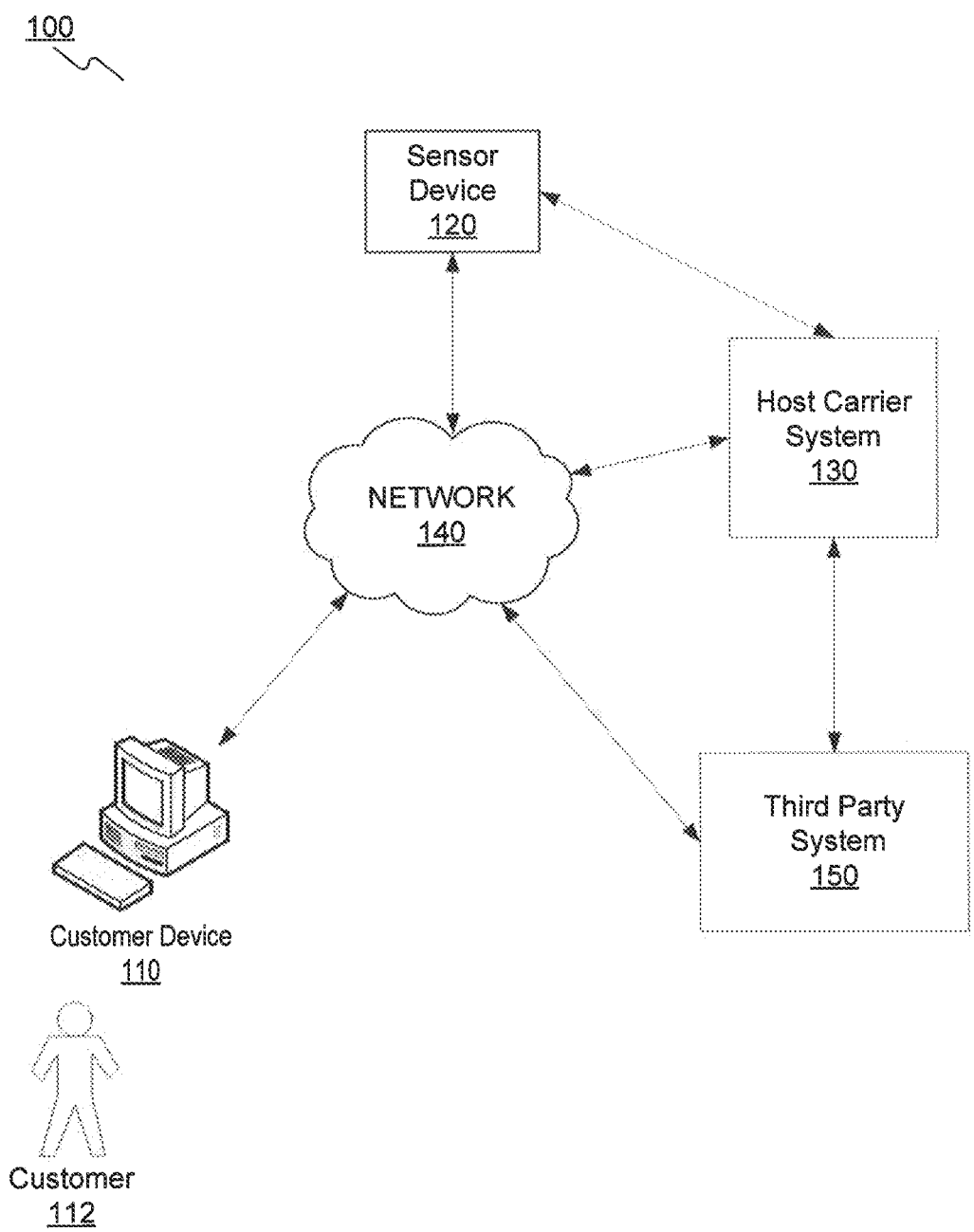
FIG. 1 illustrates an exemplary system that may be used for implementing the disclosed embodiments.

Reference will now be made in detail to the exemplary embodiments, examples of which are illustrated in the accompanying drawings. Wherever possible, the same reference numbers will be used throughout the drawings to refer to the same or like parts.

The disclosed embodiments provide robust and interactive systems and methods for exchanging information between entities involved in the shipping process and enhancing control of the shipping process. In some embodiments, customers send information to a shipping company to create an order for a new shipment. The shipping company with which a customer creates a shipment is hereinafter referred to as the "host carrier." A "customer" may be an individual, a group of individuals, a business, or another type of entity. The host carrier may receive one or more shipped objects from the customer. For purposes of discussion, the one or more shipped objects are hereinafter collectively referred to as a "package." The host carrier may dispatch the package from the origin location toward the package's designated destination. The time and route travelled by the package from the package's origin to destination are hereinafter collectively referred to as a "journey." Host carrier computers may analyze data associated with a newly created shipment, to simulate the journey that the package will travel, and predict any possible problems to warn the customer. After the package has been dispatched and begins the journey, host carrier computers may analyze received data associated with the portion of the journey traveled thus far, to detect problems that arise. In some embodiments, the host carrier may ship the package using the host carrier's own aircraft, trucks, vessels, or other vehicles. In other embodiments, the host carrier may transfer the package to other entities for some, or all, of a package's journey. Entities other than the host carrier that may handle and/or transport a package during the package's journey are hereinafter referred to as "partner carriers."

The host carrier computers may receive data related to the journey from one or more partner carriers, one or more sensor devices attached to the package, and other third party entities. The customer may access the data received by the host carrier computers via a user interface generated by the host carrier computers, to check the status and location of the package. The customer may also request periodic updates regarding the journey. In some embodiments, host carrier computers analyze received data to detect problems that have arisen in the journey, and/or predict problems that could arise, based on historical data patterns. For purposes of discussion, these problems are hereinafter referred to as "alert conditions."

If an alert condition is detected or predicted, the host carrier may notify the customer by transmitting one or more electronic messages to one or more devices associated with the customer. The host carrier may also transmit appropriate electronic notifications to devices associated with individuals employed by the host carrier, the partner carriers, or other third party entities. After notifying the customer of the alert condition, the host carrier may present different options to the customer, hereinafter referred to as "alternative options." The customer may modify the journey by selecting one or more alternative options to, for example, change routes, shipping speeds, and/or select different flights or trips offered by the host carrier and/or partner carriers. Presentation of the alternative options to the customer may also include presentation of statistics, recommendations, and/or advice generated by the host carrier computers, to help guide the customer toward achieving the customer's goals while minimizing costs, damage, or loss. For example, the host carrier may recommend a different mode of transportation, a different carrier, particular flights, or scheduled trips, or different shipping speeds, based on reliability, schedule compatibility, pricing, and/or likelihood of safe and sound arrival, to suit the customer's needs. In some embodiments, the host carrier may present the rationale for the recommendation, such as recommending a carrier that is usually on-time if delays are predicted for a carrier that is known to frequently cancel or postpone flights. As another example, a route with historically mild temperatures may be recommended if the current route is experiencing heat waves, or has average temperatures that are too hot for package contents. As a further example, if patterns of damage are detected in a particular route, different shipping speeds or transportation modes that are determined to be safer may be recommended. Once a selection of action to be taken is received, the host carrier may take the appropriate actions, including, if necessary, notifying the involved carrier(s) and third parties to modify the journey.

FIG. 1 is a block diagram illustrating an exemplary system 100 that may be used for implementing the disclosed embodiments. In one embodiment, system 100 may include one or more customer devices 110, one or more sensor devices 120, one or more host carrier systems 130, one or more networks 140, and one or more third party systems 150.

Customer device 110 may include one or more computing devices associated with customer 112, that perform graphical data display, data processing, and bi-directional data communication with network 140. For example, customer device 110 may include a personal general-purpose desktop computer, laptop, notebook, tablet, smart phone, or any other device with sufficient data processing and data communication capabilities. In some aspects, customer device 110 may be a wired or wireless device such as a PDA, cellular phone, mobile telephone, cordless phone, or IP corded telephone, through which customer 112 may provide and receive information via a user interface of customer device 110. In some embodiments, customer device 110 may include one or more processors configured to execute software instructions stored in memory to perform one or more methods consistent with the disclosed embodiments. For example, customer device 110 may execute one or more applications to establish bi-directional data communication with sensor device 120, host carrier system 130, and/or third party systems 150, via, for example, network 140. Customer device 110 may further execute one or more applications to present data to customer 112 and receive input from customer 112. For example, customer 112 may interact with customer device 110 to review information regarding their package's journey and input selections for modifying the journey.

In some embodiments, host carrier system 130 may receive data from one or more third party systems 150 by a data interface such as, for example, an application programming interface (API). Third party system 150 may be operated by a third party entity such as a partner carrier, a news service, a weather service, a government agency, or any other entity involved in the shipping process.

Partner carriers may include, for example, airlines, shipping lines, trucking lines, railways, or couriers. Host carrier system 130 may receive data associated with a journey from one or more third party systems 150 operated by partner carriers such as, for example, scheduling data, delay data, pricing data, and package scan data. Scheduling and delay data may include, for example, timetables, information regarding delays, mechanical breakdowns, accidents, and cancellations. Pricing data may include, for example, price rates for different package sizes, weights, routes, modes of transportation, and shipping speed. Package scan data may include, for example, time-stamped location information of a package. Package scan data may also include, for example, annotations for each scan to indicate package arrival at a location, processing, departure, hand-off to customs, receipt from customs, hand-off to another carrier, and final destination delivery. In some embodiments, host carrier system 130 may maintain a database of flight data including host carrier flights and partner carrier flights.

In some embodiments, one or more third party system 150 are operated by a local or national news service. Host carrier system 130 may receive news data from the news service regarding events that may impact shipping efficiency such as, for example, road, rail, airport, or sea port closures, natural disasters, evacuations, holidays, crime reports, and any other local or national news regarding situations that may impact the shipping industry.

In some embodiments, one or more third party system 150 are operated by a local or national weather service. Host carrier system 130 may receive weather data from the weather service such as, for example, precipitation forecasts, storm and inclement weather forecasts, storm path tracking and forecasts, heat alerts, temperature forecasts, weather trends, historical weather data, and any other weather data that may be relevant to shipping efficiency.

In some embodiments, one or more third party system 150 are operated by a government agency such as, for example, customs agencies or transportation bureaus. Host carrier system 130 may receive data from the government agency such as, for example, customs data, policy data, and any other data relevant to shipping efficiency. Customs data may include, for example, status data regarding the arrival, processing, and departure of a package through customs, as well as duty pricing. Policy data may include, for example, prohibit items or package restrictions, customs rules, or other government rules relevant to shipping.

Network 140 may be any type of network configured to provide bidirectional communications between components of system 100. For example, network 140 may be any type of network (including infrastructure) that provides communications, exchanges information, and/or facilitates the exchange of information. For example, network 140 may comprise the Internet, a Local Area Network, and/or other suitable connection(s) that enables the sending and receiving of information between the components of system 100. In other embodiments, one or more components of system 100 may communicate directly through a dedicated communication link(s). For example, sensor 120 and host carrier system 130 may communicate additionally or alternatively through a direct communications link. As another example, host carrier system 130 and third party systems 150 may communicate additionally or alternatively through a direct communications link. Direct communications links may be any known wired or wireless connection that allows for fast, bidirectional communication, such as LAN, WLAN, Bluetooth™, Wifi, or satellite link. Direct communications links may also be implemented as secure, encrypted connections over network 140.

Figure 2:
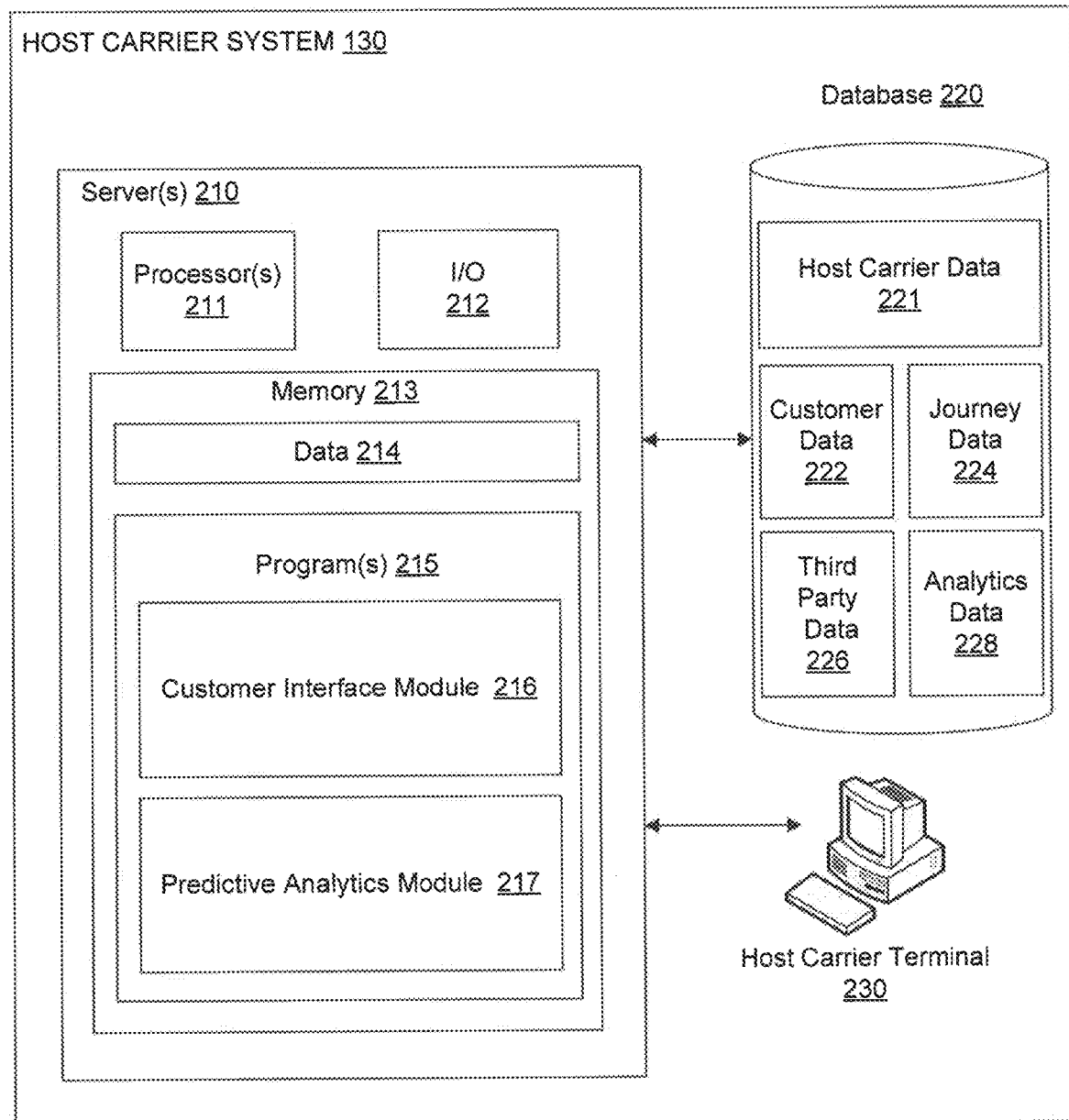
FIG. 2 illustrates an exemplary host carrier system that may be used for implementing the disclosed embodiments.

In some embodiments, as depicted in FIG. 2, host carrier system 130 comprises one or more servers 210, one or more databases 220, and/or one or more carrier terminals 230. Carrier terminal 230 may be a computing device such as a general-purpose computer, a laptop, or a smartphone configure to perform functions related to methods disclosed herein, and operated by an employee of the carrier. For example, carrier terminal 230 may be a portable device used by carrier employees to scan package barcodes or receive alert notifications. As another example, carrier terminal 230 may be a computer used to view and manage data stored in database 220, or communicate with customer device 110, server device 120, and/or third party systems 150.

Server 210 may include one or more processors 211, one or more input/output (I/O) devices 212, and one or more memory devices 213. Server 210 may take the form of a general-purpose computer, a mainframe computer, or any combination of these components. Server 210 may be stand-alone, or it may be part of a subsystem, which may be part of a larger system. Processor 211 may include one or more known processing devices. The disclosed embodiments are not limited to any particular type of processor(s) configured in server 210. Memory 213 may include one or more storage devices configured to store computer-readable instructions used by processor 211 to perform functions related to disclosed embodiments. For example, memory 213 may be configured with one or more software instructions, such as program(s) 215 that may perform one or more operations when executed by processor 211. Additionally, processor 211 may execute one or more programs located remotely from server 210. For example, host carrier system 130, via server 210, may access one or more remote programs, that, when executed, perform functions related to certain disclosed embodiments. The disclosed embodiments are not limited to separate programs or computers configured to perform dedicated tasks. For example, memory 213 may include a single program that performs the functions of the server 210, multiple programs, or a program comprising multiple modules. For example, program 215 may comprise a customer interface module 216 and predictive analytics module 217.

Customer interface module 216 may comprise computer instructions which, when executed, cause processor 211 of server 210 to generate one or more web portals or websites for exchanging information related to a journey with customer 112. For example, customer interface module 216 may cause server 210 to create graphical displays presenting journey data including the location of a package, and collected sensor data, detected alert conditions, alternative options, and recommendations. Customer interface module 216 may also cause server 210 to present graphic user interfaces that allow customer 112 to enter data regarding a new shipment, or selection of modifications to a current journey.

Predictive analytics module 217 may comprise computer instructions which, when executed, cause processor 211 of server 210 to perform statistical analyses that incorporate some or all of host carrier data 221, received customer data 222, journey data 224, third party data 226, and analytics data 228, discussed in further detail below. Statistical analyses may include, for example, generation or update of data models, trends, patterns, and statistics. In some embodiments, statistical analyses utilize data regression, rules-based logic, learning algorithms, and/or other known modeling algorithms, to determine a status of a package, the underlying causes or factors influencing the status, detect alert conditions, predict potential alert conditions, evaluate success and failure of different aspects of a journey, and evaluate the advantages and disadvantages of possible modifications to the journey. The functions of modules 216 and 217 are further explained throughout this disclosure with respect to disclosed embodiments and examples.

I/O devices 212 may be one or more devices configured to allow data to be received and/or transmitted by server 210. I/O devices 212 may include one or more digital and/or analog communication devices that allow server 210 to communicate with other machines and devices, such as customer device 110.

Memory 213 may also store data 214 that may reflect any type of information in any format that host carrier system 130 may use to perform shipping functions. For example, data 214 may include data associated with customer 112 and data collected for packages shipped by customer 112.

Server 210 may also be communicatively connected to one or more database(s) 220. Server 210 may be communicatively connected to database(s) 220 through network 140. Database 220 may include one or more memory devices that store information and are accessed and/or managed through server 210. Host carrier system 130 may include one or more databases 220. Alternatively, or additionally, one or more databases 220 may be located remotely from host carrier system 130. Database 220 may include computing components (e.g., database management system, database server, etc.) configured to receive and process requests for data stored in memory devices of database(s) 220 and to provide data from database 220.

Database 220 may receive, store, and distribute any and all data related to methods disclosed herein. For example, database 220 may store host carrier data 221, customer data 222, journey data 224, third party data 226, and analytics data 228.

Host carrier data 221 may include data specific to the host carrier such as, for example, scheduling data, delay data, and pricing data. Scheduling and delay data may include, for example, timetables, information regarding delays, mechanical breakdowns, accidents, and cancellations. Pricing data may include, for example, price rates for different package sizes, weights, routes, modes of transportation, and shipping speed.

Customer data 222 may include data related to customer 112 such as, for example, account information, personal information, contact information, shipment history, statistical data such as trends or patterns derived from shipment history, and customer preferences such as preferred carriers, shipping methods, shipping speeds, special requirements for shipments, and sensor settings such as data collection rates, reporting rates, and alert condition data value limits or ranges.

Journey data 224 may include data related to journeys in-progress for customer 112's shipments such as, for example, journey itinerary/schedule, time-stamped GPS data, package scan data, sensor data, carrier information, transportation method, shipping speed, alert condition information, and information regarding journey modifications. Journey data 224 may also include statistical data derived regarding the journey, such as trends and patterns.

Third party data 226 may include all data received from third party systems 150, as previously discussed with respect to FIG. 1.

Analytics data 228 may include statistical data generated by predictive analytics module 217 from all data collected for customer 112 and the host carrier's other customers. Data from other customers may be anonymized to protect identity while enhancing accuracy by incorporating as much data as possible into analysis and processing. Analytics data 228 may include, for example, trends, patterns, and data models generated by host carrier system 130, which are explained in detail with respect to FIG. 5.

Figure 3:
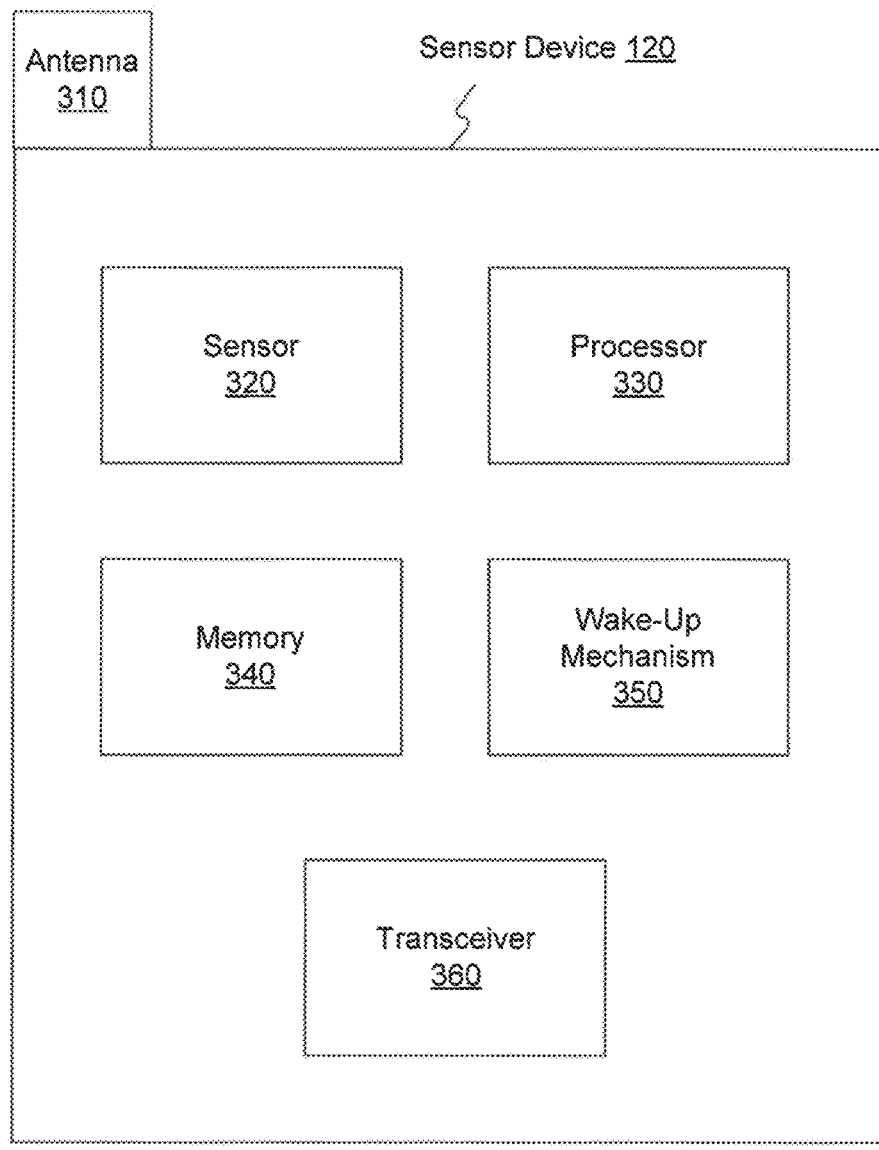
FIG. 3 illustrates an exemplary sensor device that may be used for implementing the disclosed embodiments.

In some embodiments, as depicted in FIG. 3, sensor device 120 includes, among other things, one or more antennas 310, one or more sensors 320, one or more processors 330, memory 340, one or more wake-up mechanisms 350, one or more transceivers 360, and one or more power source, such as a battery (not shown). Sensor(s) 320 may measure one or more parameters associated with the sensor device 120. For example, a sensor 320 may measure acceleration, motion, temperature, pressure, location, altitude, humidity, ambient light, and/or other environmental parameters. For example, a sensor 320 may be a GPS location sensor that determines GPS coordinates associated with sensor device 120. Moreover, for example, sensor 320 may be an accelerometer that collects data indicating movement, shock, or turbulence. In addition, for example, sensor 320 may be an internal and/or external package temperature sensor, to sense the temperature of package contents and/or ambient temperature. Memory 340 may store computer program code that may be executed by processor 330. Processor 330 may be configured to monitor sensor(s) 320. Processor 330 may, for example, store monitored sensor data in memory 340 and/or may transmit monitored sensor data via transceiver 360 and antenna 310. Processor 330 may use an internal or external clock to time-stamp monitored sensor data. While sensor device 120 is depicted as a single device, sensor device 120 may also be a set of devices that operate in conjunction. For example, a set of devices may include a sensor device 120 having sensors 320 that send monitored sensor data to another sensor device 120, which then transmits aggregated monitored sensor data via transceiver 360 and antenna 310.

In some embodiments, sensor device 120 is placed within or near a shipped object, such as a package. Server 210 may store data that associates sensor device 120 with a particular package and/or customer 112. In some embodiments, more than one package is associated with a single sensor device 120. In such embodiments, sensor device 120 may be affixed to a shipping container having multiple packages shipped by one or more customers 112. As server 210 receives data from sensor device 120, server 210 may associate the received sensor data with each package in the shipping container for each associated customer 112.

In some embodiments, sensor device 120 is capable of entering a "sleep" mode in which some or all of its components are powered off or put in a low-power state. Wake-up mechanism 350 may receive power in such a sleep mode and may be configured to cause sensor device 120 to resume normal operation upon receiving a signal to exit sleep mode. For example, wake-up mechanism 350 may be connected to a clock (not shown), wherein, at a predetermined time determined based on the clock, the wake-up mechanism 350 causes sensor device 120 to resume normal operation.

Transceiver 360 may facilitate sending data to and receiving data from external sources (e.g., via the Internet or via a cellular network). Transceiver 360 may utilize antenna 310 to send and receive data via, for example, a cellular network. In some embodiments, memory 340 stores instructions regarding the destination for data obtained from sensor(s) 320. Sensor device 120 may be configured to transmit using transceiver 360 and antenna 310, data from sensor(s) 320 to server 210. In some embodiments sensor device 120 and server 210 interact directly. However, in other embodiments, any number of intermediary devices may route data sent between sensor device 120 and server 210, such as one or more communication devices associated with network 140.

Sensor device 120 may transmit collected data in real-time as the data is collected, according to a predetermined transmission rate or schedule, or store data until communication is reestablished for transmission. In some embodiments, memory 340 stores one or more transmission rates for transmitting collected data. Transmission rate(s) may be preset by host carrier system 130, by customer device 110 based on input from customer 112, by customer preferences stored in customer device 110 or database 220, or by third party system 150. Sensor data from sensor(s) 320 may be transmitted, using transceiver 360 and antenna 310, to server 210 at the predetermined transmission rate. In some embodiments, if data transmission capability from sensor device 120 is temporarily interrupted due to interference or sensor device 120 being out-of-range of network 140, data from sensor(s) 320 may be temporarily stored in memory 340 until transmission capabilities are restored and stored data may be sent to server 210 in a batch. Furthermore, when sensor device 120 is configured to transmit according to a transmission schedule, data from sensor(s) 320 may be temporarily stored in memory 340 until the next transmission interval according to the transmission schedule.

In some embodiments, sensor device 120 may be set to different data collection rates, to satisfy the needs of customer 112 and/or host carrier system 130. Data collection rates may be preprogrammed by either host carrier system 130 or customer device 110 based on input from customer 112, or based on received notifications transmitted from host carrier system 130, third party system 150, and/or customer device 110 containing instructions to alter sensor device 120 operations. In some embodiments, customer 112 preferences saved in database 220 may automatically set data collection and transmission rates. Data collection rates may be initially set by host carrier system 130 to collect data at a rate suitable to preserve battery power for the length of the journey. Data collection rates may be modified to ensure sufficient data is collected for analysis by server 210. For example, packages having temperature-sensitive contents may require frequent temperature readings, to detect alert conditions and mitigate heat or cold damage early. In this example, sensor device 120 may be set to collect data every few minutes, and set to transmit collected data at a longer interval, such as every hour, to conserve battery power.

If host carrier system 130 detects an alert condition, sensor device 120 data collection rates and/or transmission rates may be increased to provide frequent readings for monitoring the alert condition. In some embodiments, customer 112 may identify which types of alert conditions cause sensor device 120 data collection rates and/or transmission rates to increase, and may preprogram the increased rates. Once the alert condition has ended, data collection rates and transmission rates may return to the previously set rates. In some embodiments, sensor device 120 may possess some processing and analysis capabilities, to detect alert conditions and automatically modify data collection rates and transmission rates.

In some aspects, sensor device 120 may alter data collection and transmission rates based on, for example, journey schedule/itinerary, GPS location, or based on package status determined using sensor data. For example, sensor device 120 may alter data collection and/or transmission rates when package journey schedule indicates that the package is supposed to be on an airplane flight. As another example, sensor device 120 may determine package status based on collected sensor data, such as by analyzing GPS, accelerometer, air pressure, altitude, and temperature data. The determined package status may indicate whether the package is sitting on the ground, flying in an airplane, or travelling by ground transportation. Package status may also include detected alert conditions. Sensor device 120 may automatically set data collection and/or transmission rates for different statuses based on rules-based logic or a look-up table that correlates status to predetermined rates.

In some embodiments, sensor device 120 may alter operation of transceiver 360 and antenna 310. For example, when sensor device 120 is included in a package travelling aboard an airplane, sensor device 120 may automatically enter "airplane mode" and power down antenna 310 and transceiver 360 during flight. In some embodiments, sensor device 120 may enter "airplane mode" in response to received instructions from host carrier system 130, customer device 110, and/or third party system 130. In other embodiments, sensor device may analyze data collected from sensors 320 to detect rapid changes in air pressure, location, and/or altitude, to determine that the package is aboard an airplane flight, and must enter "airplane mode." In other embodiments, sensor device 120 may receive instructions to enter "airplane mode" at a time corresponding to a scheduled flight takeoff time. Flight schedule information may be combined with analysis of data from sensors 320, to ensure that sensor device 120 does not enter "airplane mode" when a scheduled flight is delayed. For example, if sensor device 120 determines that a flight scheduled for 9:00 AM has not yet taken off, because sensor data does not indicate any change in air pressure or altitude, sensor device 120 may postpone entering "airplane mode" until the analysis of subsequent sensor data indicates that the plane is in flight.

While in "airplane mode," sensor device 120 may continue collecting data at a previously established collection rate, but cease transmissions until "airplane mode" has ended. In some embodiments, sensor device 120 may continue transmission during "airplane mode" using a different communication method or network, such as by powering-down a cellular transmitter, while powering-up a WiFi transmitter. Settings for communication methods used during "airplane mode" may be preset by host carrier system 130, or one or more third party systems 150 such as the Federal Aviation Administration or a partner carrier.

Sensor device 120 may end "airplane mode" at a scheduled landing time, or by analyzing sensor data to deduce that the plane has landed. Upon ending "airplane mode," sensor device 120 may power-up antenna 310 and transceiver 360 to transmit data collected during the flight to server 210 in a batch transmission. Server 210 may then update journey data 224 in database 220, and update the customer interface by "back-filling" a timeline with the data collected during "airplane mode."

In some embodiments, sensor device 120 may enter "stationary mode" when the package remains stationary for extended periods of time. Sensor device 112 may enter "stationary mode" based on, for example, a predetermined schedule, instructions from host carrier system 130, customer device 110, and/or third party system 150, or based on movement data that is below a predetermined threshold over a predetermined time period, as determined by GPS location data, altimeter, and/or an accelerometer. While in "stationary mode," sensor device 120 may maintain a previously established data collection rate to ensure there is sufficient data for analysis, and reduce the transmission rate to conserve battery power. In contrast to "airplane mode," data may still be transmitted at extended intervals in "stationary mode." In some aspects, "stationary mode" may be overridden if server 210 requires frequent data transmissions to monitor a detected alert condition. For example, sensor device 120, located in a package of frozen contents sitting in a customs terminal, may enter "stationary mode" after remaining stationary for an extended period of time during a journey. While analyzing sensor data transmitted from sensor device 120, if server 210 determines that temperature values are rising and that package contents are thawing, server 210 may instruct sensor device 120 to immediately exit "stationary mode," and begin transmitting data at a higher transmission rate.

In some embodiments, sensor device 120 may also enter "inventory mode" when a stationary package does not have a designated destination or upcoming trip. While in "inventory mode" sensor device 120 may maintain a previously established data collection rate to ensure there is sufficient data for analysis, and reduce the transmission rate to conserve battery power. "Inventory mode" may be initiated and exited in a manner similar to "stationary mode." In contrast to "stationary mode," location data such as GPS location data is not transmitted to server 130 in "inventory mode."

Figure 4:
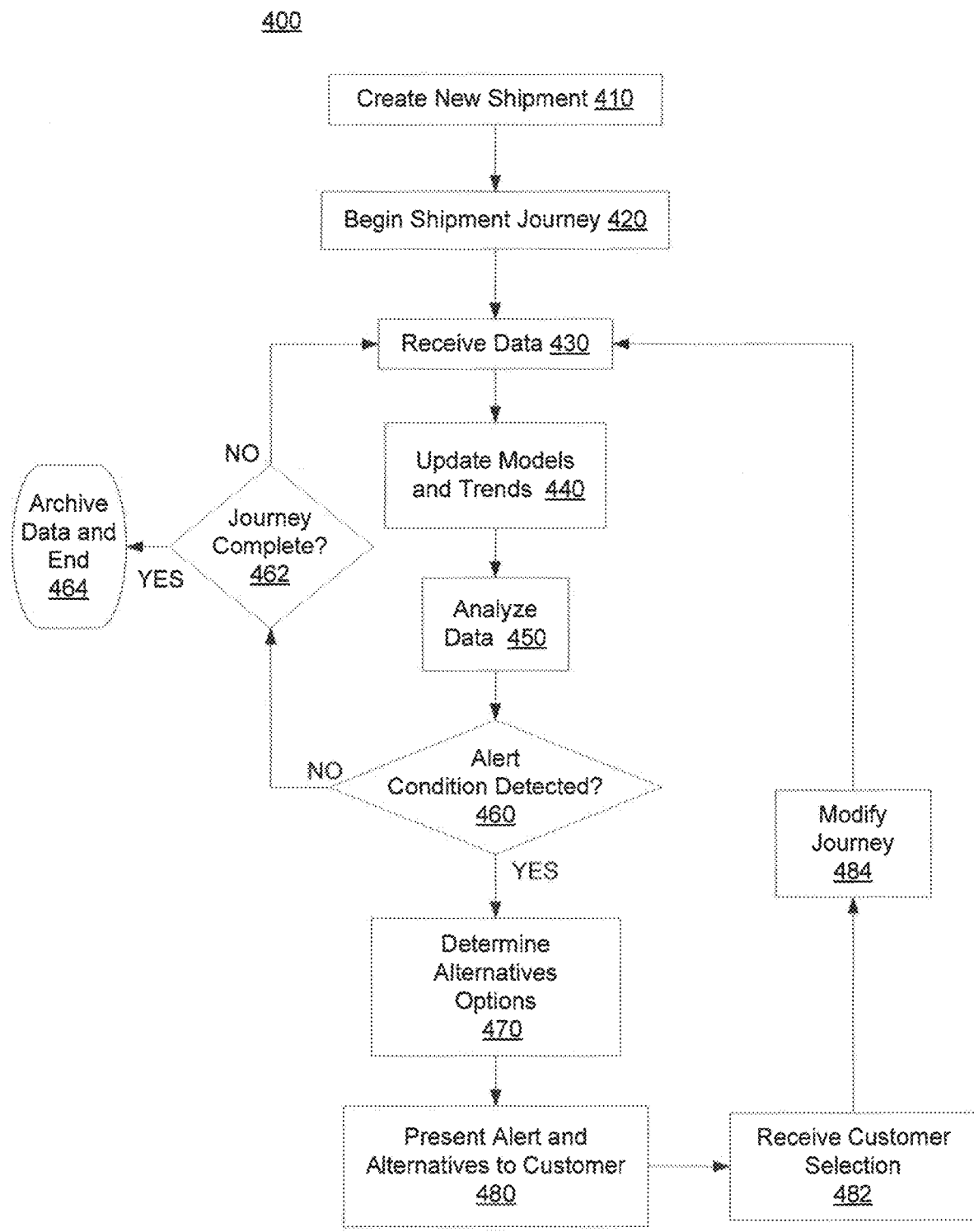
FIG. 4 illustrates an exemplary journey management method in accordance with the disclosed embodiments.

FIG. 4 illustrates an example journey management method 400. Method 400 begins with the creation of a new shipment (step 410). Host carrier system 130 may create a shipment in response to receipt of a request from customer 112. For example, customer 112 may operate customer device 110 to interact with server 210, to input information necessary to create a new shipment. Customer interface module 216 of server 210 may generate a graphic user interface to receive information from customer device 110 such as, for example, the shipment origin, destination, number of objects, object size, object weight, desired shipping speed, special needs such as temperature restrictions, and/or indications of fragile objects.

The shipment journey may begin in step 420, once the host carrier has taken possession of the package and host carrier system 130 has transmitted appropriate data regarding the shipment to any necessary third parties such as partner carriers and customs agencies. For example, server 210 may generate and transmit notifications to third party system 150 operated by a partner airline carrier to inform the pilot of the addition of the package to the flight manifest. Sensor device 120 may also be affixed to the package and activated. Server 210 may associate sensor device 120 with customer 112 and the particular journey in database 220.

In step 420, server 210 may receive data regarding the journey and package. Received data may include any type of data discussed above with respect to FIGS. 1-3. For example, server 210 may receive data transmitted from sensor device 120, package scan data, and weather forecast data for the journey route and destination. Package scan data may be received in real-time from third party systems 150 such as partner carriers or from host carrier terminal 230. Received data may be stored in database 220, as discussed above with respect to FIG. 2.

Figure 5:
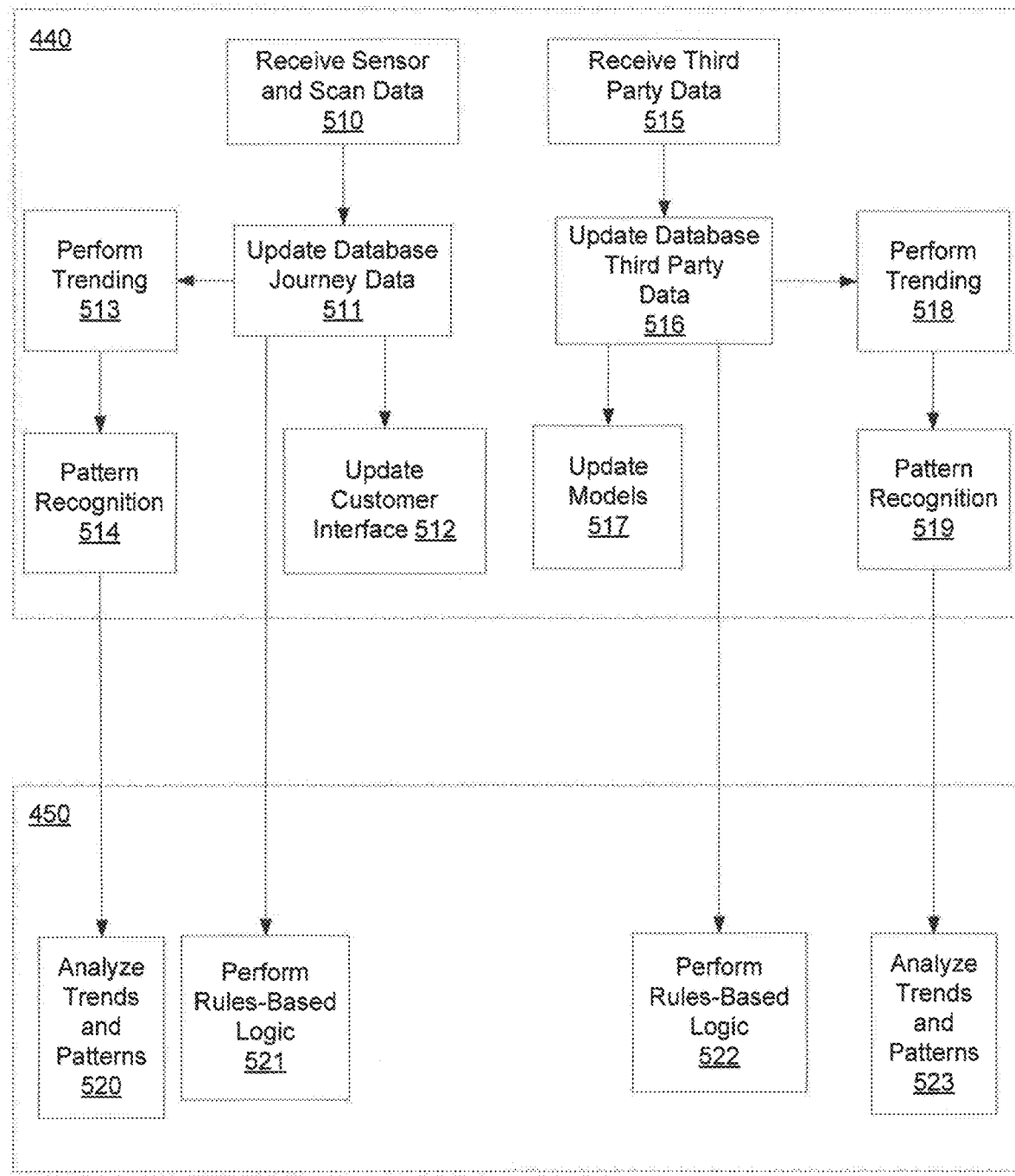
FIG. 5 illustrates an exemplary method for updating models and trends, and for analyzing data, in accordance with the disclosed embodiments.

In step 440, server 210 processes some or all received data to update stored statistical data, such as generated data models, derived trends, and derived patterns, as discussed in further detail with respect to FIG. 5.

In step 450, server 210 analyzes some or all received data, generated data models, derived trends, and/or derived patterns, to detect abnormalities, out-of-range values, trends, or patterns preprogrammed as indicative of one or more alert conditions. In some embodiments, data analysis may include the application of, for example, rules-based logic, pattern matching, regression analysis, data modeling, or any known statistical analysis method appropriate for identifying abnormalities in time-sequenced data sets.

In step 460, server 210 determines whether one or more alert conditions have been identified. Alert conditions may include, for example, the risk of damage to package contents from heat or excessive motion sensed by sensor device 120. As another example, alert conditions may include flight delays due to weather, holiday high volume congestion, or delays in customs ports/terminals.

If no alert conditions are detected in step 460, collected data and/or the journey schedule is analyzed to determine whether the journey has ended (step 462). Data indicating the end of a journey may include, for example, package scan data from the destination location, a notation of "delivered" in the package scan data, or GPS data including the journey destination coordinates. If server 210 determines that the journey has ended, all data collected for the journey may be archived with customer data 222 in database 220 (step 464). If the journey has not ended, method 400 may return to step 430, and server 210 receives additional data.

Returning again to step 460, if one or more alert condition are detected, server 210 launches a subroutine to determine alternative options for mitigating the negative effects of the alert condition (step 470). For example, if a package remains in a single location for an unusually long period of time, yet is scheduled to be in transit, and host carrier system 130 determines that the underlying cause is a cancelled flight, server 210 may compile alternate flights offered by the host carrier and partner carriers to which the package may be transferred. An exemplary subroutine for determining alternatives is discussed in further detail with respect to FIG. 6.

Once server 210 has determined alternative options, the alert condition and alternative options are presented to customer 112 in step 480. In some embodiments, server 210 may generate and transmit a notification to customer device 110, to inform customer 112 that an alert condition has been detected. Customer interface module 216 may cause server 210 to generate a graphical user interface including details regarding the alert condition, proposed alternative options, recommendations, and probabilities of success for individual alternative options. The presented alternative options may include an option to continue the journey without modification. The graphic user interface may be accessed by customer device 110.

In some embodiments, server 210 may generate and transmit notifications to report information other than alert conditions, to one or more of customer device 110, host carrier terminal 230, and/or third party system 150 (step not shown in figures). Notifications may include information such as package tracking number, sensor device 120 identification number, detected alert condition(s), package location, package origin, package destination, carrier handling the package, shipping speed, and/or journey start date. Notifications may be generated, for example, based on data indicative of package location, such as package scan and GPS data. For example, a notification may be generated and transmitted to customer 112, host carrier terminal 230, or third party system 150 such as a customs agency, when the package is crossing country borders entering or exiting a country. Server 210 may transmit a notification to some or all customs agencies involved in a journey, to inform customs agencies what date and time to expect a shipment, and later inform them once GPS information for the package indicates that the package has crossed borders into the country. Settings regarding when to transmit such notifications to a customs agency, how often to transmit updated notifications, and which information to include may be predetermined and preset by that customs agency. Accordingly, server 210 may change settings regarding notifications dynamically as a package traverses multiple countries.

As another example, server 210 may generate and transmit one or more notifications to the carrier who will be handling the package, for creating a shipment manifest or inventory. For example, third party system 150 operated by a partner carrier may receive a notification indicating the tracking number of the package that will be handled by the partner carrier, the package journey origin and destination. Such a notification may be especially useful for smaller carriers who traditionally generate manifests by compiling the information from all package labels, and may miss information. The use of electronic notifications enhances efficiency and accuracy for the partner carriers and the entire shipping process.

Figure 7:
FIG. 7 illustrates an exemplary alert notification in accordance with the disclosed embodiments.

In some embodiments, an alert notification for a graphical user interface, such as that shown in FIG. 7, may be generated and transmitted to customer device 110 for display to customer 112. The alert notification may describe the event or condition that triggered the alert. In the example shown in FIG. 7, host carrier system 130 detects delays in a journey due to winter storms, and server 210 generates a graphic user interface for the alert notification. The displayed alert notification includes one or more alternative options for modifying the journey, such as the options "ship with air" and "ship with rail," to mitigate the negative effects of the alert condition. The displayed alternative options may include an option to continue the journey without modification. For example, if the journey was originally configured to ship by air, a selection of the alternative option "ship with air" would inform server 210 to proceed without modifying the journey. Additionally, the alert notification may include advice or recommendations regarding the displayed alternative options. In the example shown in FIG. 7, a recommendation is provided to customer 112 to ship by rail to reduce the probability of delays.

Referring again to FIG. 4, in step 482 server 210 receives customer 112's selection of one of the alternative options, transmitted from customer device 110. Server 210 may modify the journey, consistent with customer 112's selection in step 484. To modify the journey, server 210 may create and transmit one or more messages to the proper entities. For example, if customer 112 chooses to transfer their shipment from air to rail, server 210 may issue notifications to both the air carrier and the rail carrier with instructions to transfer one or more packages for that shipment. As another example, if customer 112 selects to change sensor device 120 data collection or reporting rate, such as when a low battery alert notification is issued, server 210 may transmit commands to sensor device 120 via direct communication link or via network 140, to implement the modification. As a further example, if customer 112 selects to change shipping speed from "standard" to "next day," server 210 may create and send a notification to one or more employees of the host carrier or partner carrier currently handling the package, with instructions to change the shipping speed to "next day." In some embodiments, contact information and notification templates may be stored in database 220 for access and use by server 210.

After server 210 completes actions for modifying the journey based on the alternative option selected by customer 112, method 400 returns to step 430, where server 210 receives additional data. In some embodiments, server 210 may receive data throughout some of all steps of method 400, such as continuously receiving new data, while analyzing previously collected data and issuing alert notifications.

FIG. 5 illustrates examples of model and trend update step 440 and data analysis step 450. In some embodiments, server 210 may perform steps 440 and 450 as continuous background processing of all data received for customer 112 and anonymized data for other customers. Model and trend update 440 begins when processor 211 receives sensor and scan data (step 510) and/or receives third party data (step 515) from I/O devices 212. In step 511, server 210 may update journey information 224 in database 220 to incorporate the newly received sensor and scan data. Customer interface module 216 may also update one or more graphical user interfaces generated to display data associated with customer 112, such as the graphic user interface illustrated in FIG. 8 (step 512).

Server 210 may perform statistical analyses on collected data, such as data trending (step 513) and pattern recognition (step 514). In step 513, recently collected data may be processed in combination with historical data for the journey, to determine trends. For example, temperature data collected from sensor device 120 may be analyzed to determine the rate at which package temperature is increasing, which may be indicative of rapid thawing of frozen package contents, a warning sign of heat damage. In step 514, data collected for the journey may be analyzed to recognize patterns. Recognized patterns may be used by carrier system 130 to detect alert conditions by matching previously recognized patterns stored by host carrier system 130 and associated with one or more alert conditions. A recognized pattern may also be stored and associated with a new alert condition identified by carrier system 130, a host carrier employee operating host carrier terminal 230, and/or customer 112 operating customer device 110 (step not shown). For example, if customer 112 reports damage to a received package, host carrier system 130 may store acceleration and/or temperature patterns detected in the journey as associated with damage risk in database 220 for future pattern matching.

In step 516, server 210 may update third party data 226 stored in database 220 with newly received third party data. Data models may be updated in step 517. One or more data models may be created and updated using predictive analytics module 217. The data models may incorporate various portions of host carrier data 221, customer data 222, journey data 224, third party data 226, and/or analytics data 228. Furthermore, data for all of the host carrier's customers may be anonymized and incorporated into the data models, to improve accuracy. Data models may allow predictive analytics module 217 to predict future alert conditions based on data for a current journey. For example, a data model may be generated to simulate the effects of seasonal weather patterns on package contents, using sensor device 120 temperature readings, historical weather data, weather forecast data, and historical reports of heat damage. Such a data model may alert customer 112 and host carrier system 130 of probable heat damage, based on the current journey data input into the data model. As another example, one or more data models may simulate the effects of various journey modifications, to provide better recommendations to customer 112. Expanding upon the weather model example discussed above, the data model may incorporate weather patterns of alternative routes, weather effects on different transportation methods, or the temperature effect on different shipping speeds. Server 210 may use such a model to generate recommendations for customer 112 to highlight the alternative options that would best suit customer 112's needs, further discussed with regard to FIG. 6.

Third party data may be processed for trending (step 518) and pattern recognition (step 519). In some embodiments, data from individual third party systems 150 may be processed for pattern recognition. For example, data from third party system 150 operated by a partner carrier may be analyzed to determine trends and patterns in cancellations or delays for that partner carrier. In other embodiments, pattern recognition and data trending may be performed for combinations of data from multiple third party systems 150. For example, weather data received from a weather service processed in conjunction with data for one or more partner carriers may identify trends and patterns of delays and cancellations correlated to weather conditions.

After updating models and trends in step 440, data may be analyzed in step 450 to detect alert conditions. Journey data trends and patterns may be analyzed in step 520. Rules-based logic may be applied directly to journey data in step 521, such as determining whether data values from sensor device 120 exceed a threshold. In step 522, server 210 may apply rules-based logic to third party data 226, such as comparing weather forecast temperatures to upper and lower limits. In step 523, third party data trends and patterns are analyzed to detect alert conditions, such as patterns of reoccurring delay for a particular partner carrier flight.

Data range limits, trends, patterns, and model outcomes associated with alert conditions may be preprogrammed by a host carrier employee operating carrier terminal 230, customer 112 operating customer device 110, by one or more third party system 150, or automatically by server 210 employing learning algorithms to detect undesirable shipping results. For example, if damage or delay is reported, server 210 may associate some or all of the data patterns, trends, and model outputs from the journey as indicative of alert conditions.

In some embodiments, customer device 110 and/or server 210 may preprogram data ranges, limits, trends, or patterns with alert conditions for an individual journey, depending on the package contents. For example, when a new shipment is created for frozen items, customer device 110 and/or host carrier system 130 may automatically preprogram an upper temperature limit of 32 degrees Fahrenheit. As another example, a shipment that is labeled as time sensitive may cause server 210 to flag shipping routes, partner carriers, or transportation methods having recognized delay patterns or trends as undesirable for the journey.

Figure 6:
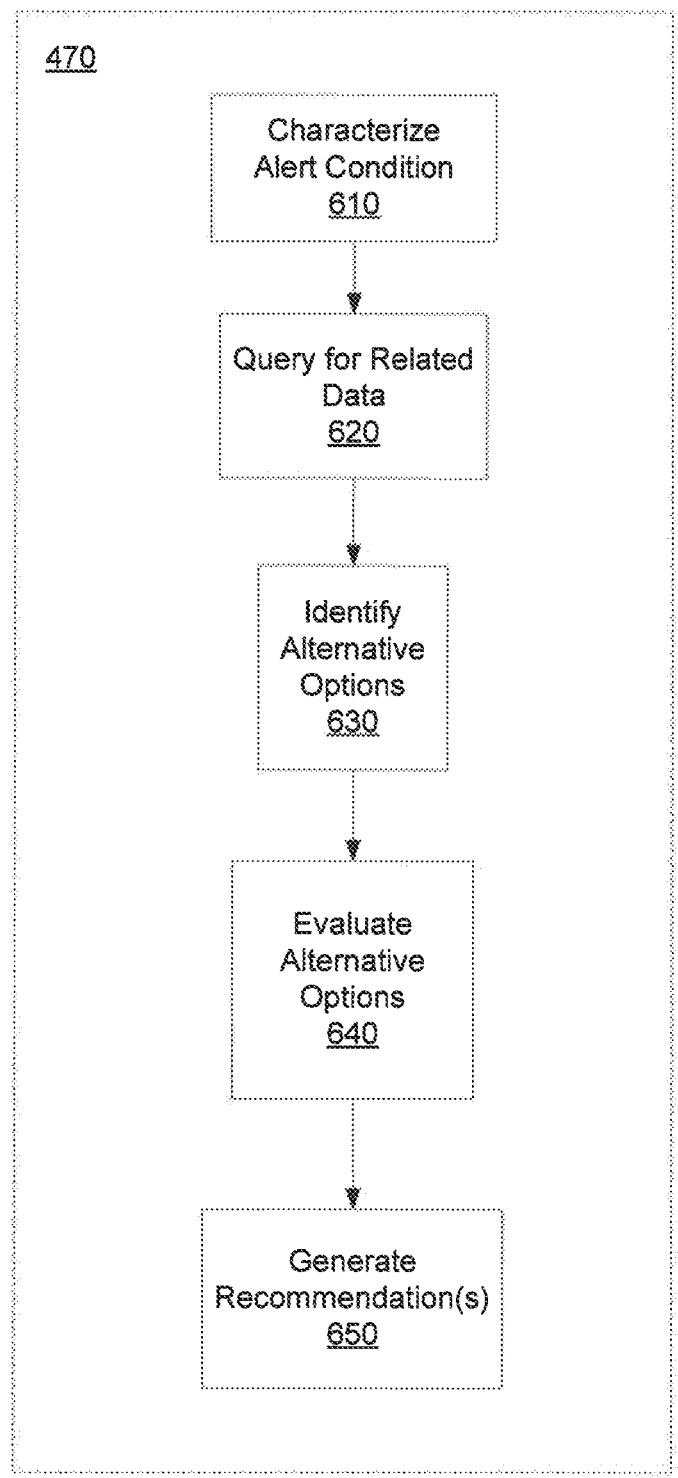
FIG. 6 illustrates an exemplary method for determining alternatives in accordance with the disclosed embodiments.

FIG. 6 illustrates an exemplary method 470 for determining alternatives options. In step 610, the method begins by characterizing the one or more alert conditions. Server 210 may determine the type of alert conditions detected such as, for example, determining that an alert condition was triggered due to high temperatures detected, inclement weather, delays, exposure of package contents to light, vibration or shock, or that the package is off track. After characterizing the alert condition, server 210 may issue one or more queries for any data related to the type of alert condition (step 620). For example, server 210 may query database 220 for any host carrier data 221, customer data 222, journey data 224, third party data 226, or analytics data 228 relevant to the type of alert condition. For example, if an alert condition is detected due to high temperatures, database 220 may be queried for all third party data 226 related to weather forecasts along the journey route and any possible alternate routes. Additionally, third party data 226 related to partner carrier flight schedules may be queried, if a different flight would be required to change routes. Server 210 may also query one or more third party systems 150 to request current, up-to-date information, such as requesting the latest flight timetables or weather updates.

In step 630, server 210 identifies alternative options. Alternative options are possible modifications to the journey that server 210 determines will address the type of problem identified in step 610 based on favorable patterns, trends, probabilities of success, and/or model outputs. For example, a weather-related alert condition may cause server 210 to seek alternative routes that pass through areas having acceptable/favorable weather forecasts for the package contents, and for customer 112's needs. As another example, delay-related alert conditions in a time-sensitive shipment may cause server 210 to seek other partner carriers, scheduled flights, and/or methods of transportation that are determined to be quicker or more reliable.

In step 640, server 210 evaluates alternative options to determine success and failure probabilities. Predictive analytics module 217 may use stored trends, patterns, and data models to calculate success and failure probabilities. To calculate success and failure probabilities, predictive analytics module 217 may calculate and compile statistics for each alternative option, to indicate the predicted effects, advantages, and drawbacks of each alternative option. For example, predictive analytics module 217 may analyze data regarding an alternative route to determine the probability of time delays, to mitigate a delay-related alert condition.

In step 650, server 210 generates one or more recommendations based on the evaluations. The recommendation may highlight one or more of the alternative options with the highest probability for mitigating the negative effects of the identified alert condition, and that best address customer 112's needs.

FIG. 7 illustrates an exemplary alert notification. In some embodiments, alert notifications may be generated by server 210 and transmitted to customer device 110 and, if necessary, to host carrier terminal 230 and/or one or more third party systems 150. Alert notifications may include, for example, a description of the alert condition, the data, trend, or pattern that caused server 210 to detect the alert condition, one or more alternative options for modifying the journey, and a recommendation to customer 112 for mitigating the alert condition. Alert notifications may be generated and transmitted during the creation of a new journey as a pre-warning, or during a journey that is in progress. For example, during the creation of a new shipment journey, server 210 may analyze previously collected package scan and location data, to detect patterns indicating delays experienced on the journey route during certain seasons or days of the year. If delay patterns are predicted during the creation of a new journey, host carrier data 221, third party data 226, customer data 222, and analytics data 228 may be analyzed to determine the underlying cause of the delay. When detecting alert conditions in a current journey, journey data 224 may also be analyzed. If the delay pattern is correlated to inclement weather patterns experienced along the journey route during a certain timeframe in the year, server 210 may determine other methods of transportation or flights during that timeframe, which may serve as alternative options mitigating the delay. In the example illustrated in FIG. 7, server 210 has determined that flight delays are higher between December and March due to winter storms. After analyzing schedule data and historical data related to delays for other flights and methods of transportation, server 210 generates a graphic user interface presenting the pre-warning alert notification, reason, alternative options for shipping by rail or continuing to ship by air, and a recommendation to ship by rail to mitigate delays and improve reliability.

Figure 8:
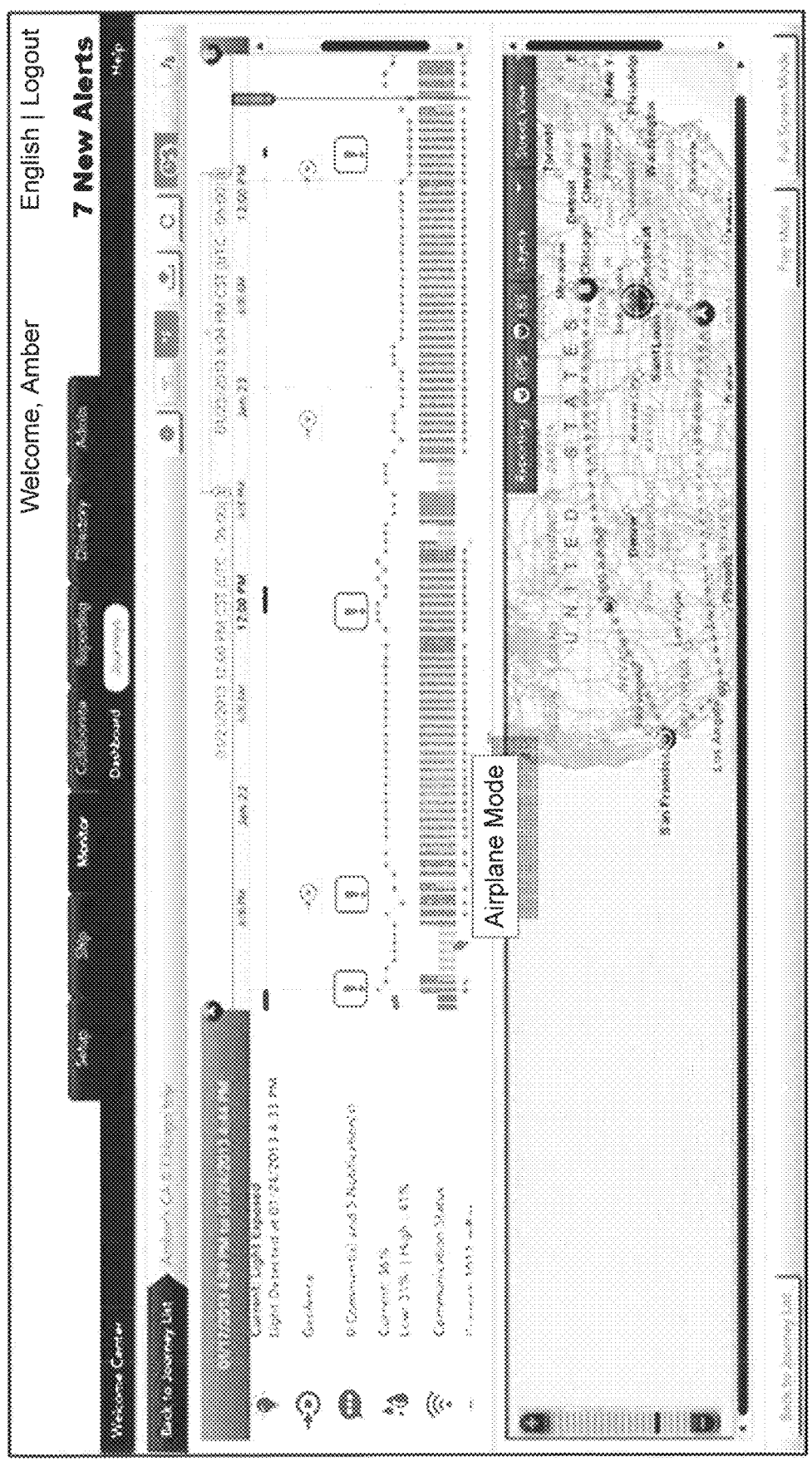
FIG. 8 illustrates an exemplary customer interface in accordance with the disclosed embodiments.

FIG. 8 illustrates an exemplary customer interface, which may be a graphic user interface generated by customer interface module 216 and may be accessed by customer device 110. The graphic user interface may display collected journey data 224 such as sensor data, third party data 226, and derived analytics data 228 related to the current journey. Data may be displayed in time-sequence order on a timeline. Data may be shown numerically or graphically, such as bar or line graphs. Communication status from sensor device 120 may be indicated on the timeline as a signal strength level graph. The customer interface may display a reason for a loss in signal strength by selecting the low signal level portion of the graph, such as by clicking or mouse-over. For example, if customer 112 selects a portion of the "Communication Status" graph that indicates low or no communication, customer interface module 216 may generate a pop-up window to inform customer 112 that sensor device 120 was placed in "airplane mode" during the period of time in question. The customer interface may also display icons on the data timeline indicating detected alert conditions, such as by displaying a box with an exclamation point. Detailed information regarding the alert condition, proposed alternative options, and the selected alternative option for journey modification may be displayed upon selecting a particular alert condition icon. In some embodiments, the customer interface may also include an interactive map, showing the current journey route, and the real-time location of the package determined by journey schedule, package scan data, and/or GPS data from sensor device 120. The interactive map may also include icons indicating points along the journey route where alert conditions were detected. Icons displayed on the interactive map may be selected by customer 112, to cause server 210 to generate and display one or more pop-up windows including information about the journey at the selected point. Furthermore, selection of an icon or point of the journey on the interactive map may cause the data timeline to automatically focus on the time in the timeline corresponding to the selected location point in the journey.

FIGS. 9-13 illustrate exemplary graphic user interfaces generated by server 210 based on detected alert conditions and outputs of predictive analytics module 217. Predictive analytics module 217 may perform continuous background processing of some or all data received from sensor device 210, third party systems 150, customer device 110, and host carrier terminal 230, as well as host carrier data 221, customer data 222, journey data 224, third party data 226, and analytics data 228. Predictive analytics module 217 may determine aspects for a current journey, or for a new journey being created by customer 112, by analyzing historically collected data to detect trends and patterns. Aspects may include, for example, cost, estimated time of journey, probability that the package will become off pace (e.g., delayed) or off track (e.g., lost), arrive safe and sound, experience tampering, damage, or other types of loss. Probabilities of delay may be determined by analyzing, for example, occurrences and patterns of flight or trip cancellations by different carriers, weather patterns at certain times of the year, traffic due to holidays, or average times for passing through different ports of customs agencies.

Predictive analytics module 217 may compile statistics for each leg of a current or new journey, and cause server 210 to transmit a graphical user interface presenting statistics to customer device 110, to allow customer 112 to review the estimated probabilities of success and failure and make informed decisions regarding the particular route, transportation method, and transportation speed of their package journey. Through the processing of many different types of collected and derived data, predictive analytics module 217 may seek the root cause of problems in customer 112's current journey or previous journeys, to prevent alert conditions in future journeys. Explicit and implicit patterns of problems in customer 112's supply chains may thus be uncovered and presented to customer 112, along with suitable alternative options for mitigating the detected problem. In some embodiments, predictive analytics module 217 may also perform cost analyses, to inform customer 112 of the amount of money lost due to detected delay and damage, compared to the price of changing carriers, transportation speeds, transportation methods, or routes.

Figure 9:
FIG. 9 illustrates an exemplary "best and worst" analysis interface in accordance with the disclosed embodiments.

FIG. 9 illustrates an exemplary "best and worst" analysis interface. Customer interface 216 may generate graphic user interface showing the best and worst aspects of the customer's journey route. "Best" and "worst" aspects are determined based in part on the alert conditions detected during a customer 112's journeys. Aspects designated as "best" may be those having the highest probability or historical rate of success, whereas "worst" aspects may be those that have experienced comparatively high rates of failure, and/or are predicted to be the result of reoccurring problems. "Best" and "Worst" aspects may also convey strengths and weaknesses in customer 112's supply chain when compared to data for other customers. In the example illustrated in FIG. 9, an analysis of customer 112's supply chain performed by predictive analytics module 217 may find that the route and configuration of the journeys used for customer 112's supply chain yields "best" aspects of 5% reduced sourcing costs (as compared to other customers) and that the volume of items shipped on Mondays is higher than other customers. In the illustrated example, "worst" aspects of customer 112's supply chain may include above average delays experienced in winter months from December through March and above average temperature damage experienced in shipments. By analyzing customer 112's data, and comparing detected trends and patterns to those of competitors and other customers, predictive analytics module 217 may educate and inform customer 112 of ways to improve efficiency and success, while lowering overall cost to successfully ship objects. Server 210 may then present one or more options for modifying the journey that suit customer 112's needs.

Figure 10:
FIG. 10 illustrates an exemplary journey modification analysis interface in accordance with the disclosed embodiments.

FIG. 10 illustrates an exemplary journey modification graphical user interface. Predictive analytics module 217 may determine the advantages and disadvantages associated with different alternative options for different modifications to the journey. For example, if server 210 detects or predicts delays in a journey, alternative options for different shipping speeds and methods may be presented to mitigate any potential time loss. Predictive analytics module 217 may determine aspects for each alternative option, such as the aspects discussed above with respect to FIG. 9. Server 210 may generate a graphical user interface displaying the alternative options with associated aspects, highlighting the advantages and disadvantages of each option. In the example shown in FIG. 10, statistics for factors such as pricing, shipping materials requirement, and likelihood of damage are displayed in conjunction with selection of "1 Day" shipping speed. In addition, a percentage of overall cost savings that takes into consideration the displayed factors is calculated by predictive analytics module 217 and displayed, to provide customer 112 with the information necessary to make decisions that suit their needs. Upon receiving a selection of a different shipping speed, server 210 may recalculate and display statistics for aspects corresponding to the newly selected alternative option.

Figure 11:
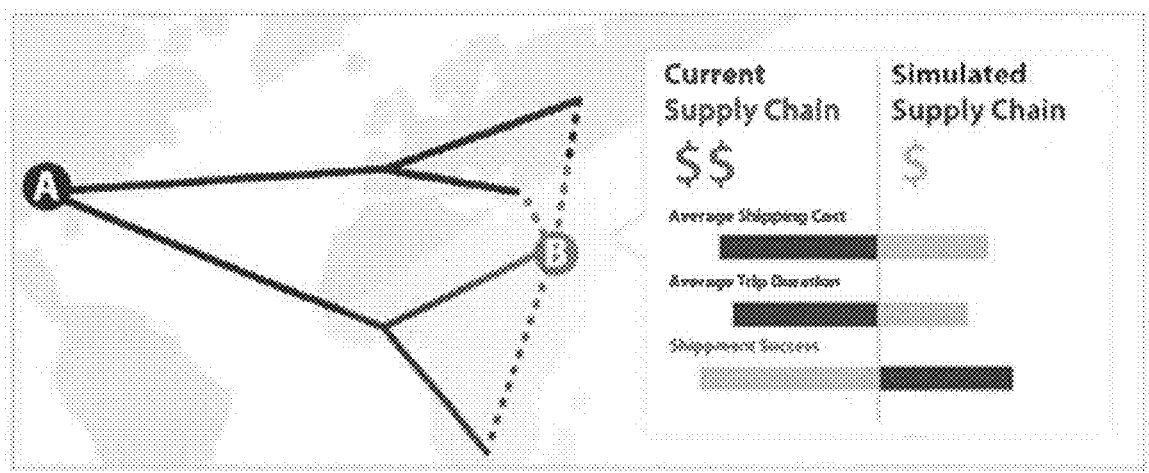
FIG. 11 illustrates an exemplary virtual modeling interface in accordance with the disclosed embodiments.

FIG. 11 illustrates an exemplary virtual modeling interface. Predictive analytics module 217 may analyze a current route for customer 112's journey or supply chain, and determine viable alternative routes that may better suit customer 112's needs based on, for example, timing, pricing, and damage aspects. A "supply chain" may be, for example, multiple shipments from the same origin to destination, involving similar objects. To propose alternative routes, predictive analytics module 217 may generate one or more simulated routes to propose to customer 112. Server 210 may analyze and report estimated cost, time, and probability of success for the current and proposed routes. Server 210 may generate an easy-to-read graphical user interface with a pictorial visualization of customer 112's current route and proposed simulated routes plotted on a map. The generated graphical user interface may also include statistics highlighting the advantages and disadvantages of customer 112's current route and each alternative. Such statistics may be displayed using graphs, icons, or numbers, to provide information in an easy-to-read and easily comparable format.

Figure 12:
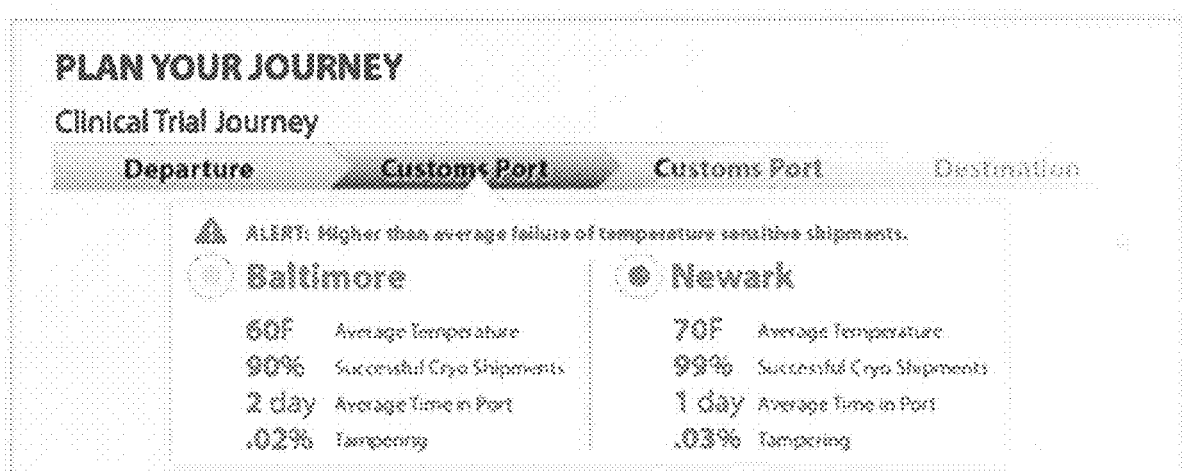
FIG. 12 illustrates an exemplary journey planning interface in accordance with the disclosed embodiments.

FIG. 12 illustrates an exemplary journey planning graphical user interface. Server 210 generates one or more graphical user interfaces accessible by customer device 110 to allow customer 112 to create and configure new shipment journeys. Once customer 112 has indicated the origin and destination locations for the journey, server 210 may generate a default journey route including predetermined journey legs and customs ports. Server 210 may then display alternative options for legs and ports along journey route that may be modified. As discussed above with respect to FIGS. 10-11, in some embodiments, predictive analytics module 217 generates aspects and calculates statistics. Server 210 may display statistics regarding aspects of each alternative option, to indicate predicted success or failure probabilities. In the example illustrated in FIG. 12, server 210 has created a new journey from an origin location, which may be indicated by customer 112, or may be a "Departure" location where the host carrier takes custody of the package, to a "Destination" location, with two intermediate stops at customs ports/terminals. Server 210 provides two alternative options for the first customs port. Predictive analytics module 217 calculates and displays statistics for different aspects of each alternative option, such as average temperature at the customs port, percentage of successful cryo (cryogenically preserved materials) shipments, average time in port, and percentage of package tampering at the port. If server 210 predicts any alert conditions, such as unfavorable patterns or trends detected by predictive analytics module 217, server 210 may display one or more alert notifications, such as the "Higher than average failure of temperature sensitive shipments" alert shown. If the new journey involves temperature-sensitive contents, customer 112 may then use the displayed alert information, and the displayed aspect statistics, to make informed decisions and select a customs port having higher success rates.

Figure 13:
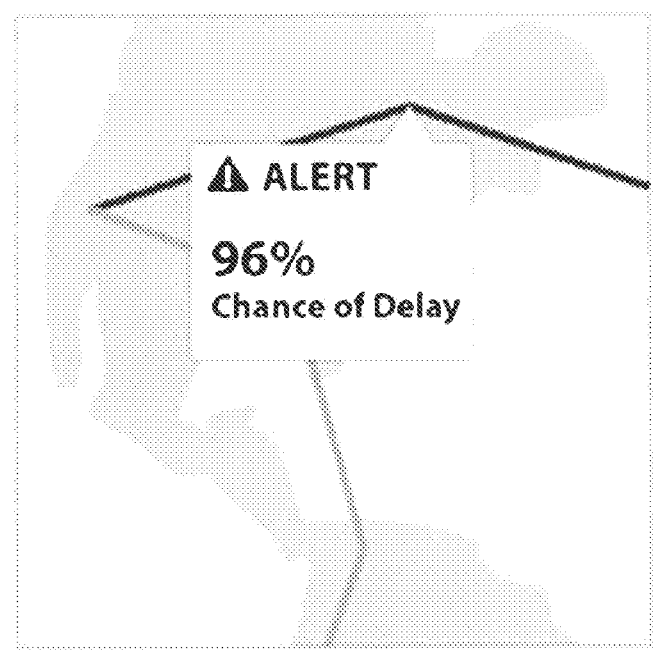
FIG. 13 illustrates an exemplary journey management interface in accordance with the disclosed embodiments.

FIG. 13 illustrates an exemplary journey management interface, consistent with disclosed embodiments. Server 210 may generate graphical user interface to visualize customer 112's current journey routes and predicted statistics or detected alert conditions associated with each journey route in pop-up windows. In the illustrated example, two journey routes are displayed on a map. The line(s) denoting a journey route may be displayed in different colors that are indicative of the status of the journey or of the journey leg. For example, the northern journey route shown on the map may be traced using dark or red lines, to indicate that one or more alert conditions have been experienced or predicted. In the example, predictive analytics module 217 has predicted a 96% chance of delay along the current journey route. Upon receiving selection of the alert condition icon, or selection of the pop-up window, server 210 may present one or more alternative options for mitigating the delay (not shown in figure).

Embodiments and all of the functional operations described in this specification can be implemented in digital electronic circuitry, or in computer software, firmware, or hardware, including the structures disclosed in this specification and their structural equivalents, or in combinations of them. Embodiments can be implemented as one or more computer program products, i.e., one or more modules of computer program instructions encoded on a computer readable medium, e.g., a machine readable storage device, a machine readable storage medium, a memory device, or a machine readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, which is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification (e.g., FIGS. 4-6) can be performed by one or more programmable processors executing one or more computer programs to perform functions by operating on input data and generating output. The methods and logic flows can also be performed by, and apparatus can also be implemented as, special purpose logic circuitry, e.g., an FPGA (field programmable gate array) or an ASIC (application specific integrated circuit). While disclosed methods include particular method flows, alternative flows or orders are also possible in alternative embodiments.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVDROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input including, for example, touch targets and gestures received on a touchscreen.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client/server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

What is claimed is:

1. A method for shipping a physical object, comprising:
   receiving, using a sensor device associated with the physical object, data associated with a journey of the physical object, the sensor device being configured to sense one or more parameters associated with the physical object;
   predicting, by a processor, a potential alert condition by comparing at least one pattern in the received data with one or more historical patterns that have been designated as being indicative of one or more alert conditions;
   determining, by the processor, a set of mitigating options for mitigating the potential alert condition;
   transmitting, to a user device, a notification including information reflecting the determined mitigating options, and information describing at least one of the one or more historical patterns that caused the processor to predict the potential alert condition;
   displaying, on the user device, the notification;
   receiving, from the user device, a selection of one of the mitigating options; and
   modifying the journey using a different mode of transportation based on the selected one of the mitigating options.

2. The method of claim 1, wherein determining the set of mitigating options includes determining one or more characteristics associated with each of the determined mitigating options.

3. The method of claim 2, further including:
   transmitting, to the user device, the one or more characteristics associated with each of the determined mitigating options.

4. The method of claim 1, wherein displaying the information reflecting the determined mitigating options further includes:
   displaying, on the user device, information reflecting one or more characteristics associated with each of the determined mitigating options, including a probability of success associated with each of the mitigating options, and advantages or drawbacks of the mitigating options.

5. The method of claim 4, wherein the probability of success comprises a likelihood that the respective mitigating option will mitigate the potential alert condition.

6. The method of claim 1, wherein determining the set of mitigating options for mitigating the potential alert condition includes generating a graphical indication configured to graphically highlight a mitigating option having a highest probability of success.

7. The method of claim 1, wherein modifying the journey using a different mode of transportation includes one or more of:
   transferring the physical object to a different carrier,
   transferring the physical object to a different trip, and
   transferring the physical object to a different type of vehicle.

8. The method of claim 1, wherein the processor is a component of a server operated by a shipping carrier.

9. The method of claim 1, wherein the user device is associated with a customer of a shipping carrier associated with the physical object.

10. The method of claim 1, further including:
    simulating an effect of at least one of the mitigating options on the journey; and
    presenting the simulated effect on the user device.

11. A non-transitory computer readable medium having stored thereon instructions for causing one or more processors to perform a method for managing a shipped physical object, comprising:
    receiving, using a sensor device associated with the physical object, data associated with a journey of the physical object, the sensor device being configured to sense one or more parameters associated with the physical object;
    predicting, by the one or more processors, a potential alert condition by comparing at least one pattern in the received data with one or more historical patterns that have been designated as being indicative of one or more alert conditions;
    determining, by the one or more processors, a set of mitigating options for mitigating the potential alert condition;
    transmitting, to a user device, a notification including information reflecting the determined mitigating options, and information describing at least one of the one or more historical patterns that caused the one or more processors to predict the potential alert condition;
    displaying, on the user device, the notification;
    receiving, from the user device, a selection of one of the mitigating options; and modifying the journey using a different mode of transportation based on the selected one of the mitigating options.

12. The non-transitory computer readable medium of claim 11, wherein determining the set of mitigating options includes determining one or more characteristics associated with each of the determined mitigating options.

13. The non-transitory computer readable medium of claim 12, wherein the one or more processors is further configured to perform:

transmitting, to the user device, the one or more characteristics associated with each of the determined mitigating options.

14. The non-transitory computer readable medium of claim 11, wherein displaying the information reflecting the determined mitigating options further includes:

displaying, on the user device, information reflecting one or more characteristics associated with each of the determined mitigating options, including a probability of success associated with each of the mitigating options, and advantages or drawbacks of the mitigating options.

15. The non-transitory computer readable medium of claim 14, wherein the probability of success comprises a likelihood that the respective mitigating option will mitigate the potential alert condition.

16. The non-transitory computer readable medium of claim 11, wherein determining the set of mitigating options for mitigating the potential alert condition includes generating a graphical indication configured to graphically highlight a mitigating option having a highest probability of success.

17. The non-transitory computer readable medium of claim 11, wherein modifying the journey using a different mode of transportation includes one or more of:

transferring the physical object to a different carrier,
transferring the physical object to a different trip, and
transferring the physical object to a different type of vehicle.

18. The non-transitory computer readable medium of claim 11, wherein the one or more processors is further configured to perform:

simulating an effect of at least one of the mitigating options on the journey; and
presenting the simulated effect on the user device.

* * * * *